(12) United States Patent
Vigil

(10) Patent No.: US 6,480,712 B1
(45) Date of Patent: Nov. 12, 2002

(54) SYSTEM AND METHOD FOR ENHANCED TEXT MESSAGE TRACKING IN A WIRELESS COMMUNICATION NETWORK

(75) Inventor: Jeff S. Vigil, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/468,704

(22) Filed: Dec. 21, 1999

(51) Int. Cl.[7] .............................................. H04M 11/10
(52) U.S. Cl. ...................... 455/412; 455/414; 455/466; 370/310; 370/466; 370/467
(58) Field of Search ................................ 455/412, 414, 455/466, 557; 370/310, 466, 467

(56) References Cited

U.S. PATENT DOCUMENTS

| | | | |
|---|---|---|---|
| 5,561,706 A | * 10/1996 | Fenner | 379/60 |
| 5,633,874 A | * 5/1997 | Diachina et al. | 370/329 |
| 5,715,278 A | * 2/1998 | Croft et al. | 375/224 |
| 5,734,643 A | * 3/1998 | Rondeau | 370/279 |
| 5,890,073 A | * 3/1999 | Fukawa | 455/557 |
| 6,163,546 A | * 12/2000 | Sipila | 370/466 |
| 6,208,634 B1 | * 3/2001 | Boulos et al. | 370/342 |
| 6,275,710 B1 | * 8/2001 | Oinonen et al. | 455/466 |

* cited by examiner

Primary Examiner—Lester G. Kincaid
Assistant Examiner—Marceau Milord
(74) Attorney, Agent, or Firm—Robert D. Varitz, P.C.

(57) ABSTRACT

An improved system of short message tracking in a wireless communications network, wherein a tracking system includes a status field bit definition having an 8-bit field wherein only three bits of the status field are used in a basic message status set, wherein the basic message status set consists of free space; used space; message received by mobile station from network—message read; message received by mobile station from network—message to be read; mobile station originating Message—message sent to the network; and mobile station originating message to be sent as text; the improvement including an enhanced message status set including the basic message status set and an extended message status set, wherein all eight bits of the status field bit (definition are used. The method of the invention includes enhancing the message status set, which further includes: forming the basic message status set; defining a set of extended message tracking definitions which use all eight bits in the status field bit definition; and forming the set of extended messages tracking definitions, wherein the basic message status set and the extended message status set comprise an enhanced message status set.

20 Claims, 3 Drawing Sheets

SYSTEM AND METHOD FOR ENHANCED TEXT MESSAGE TRACKING IN A WIRELESS COMMUNICATION NETWORK

FIELD OF THE INVENTION

This invention applies to cellular point-to-point short messaging service (SMS) and the maintaining of a status field associated with a short message. The purpose of the status field is to track the message's state from creation until delivery to a destination, and in some systems, until a reply back is received by the originator.

BACKGROUND OF THE INVENTION

The Global System of Mobile Communications (GSM) standard defines a status field associated with each short message, which is maintained by a mobile station (MS) to track the status, or state, of the message. That is, the information indicates if the message has been sent, if it is a mobile originated message, or if the message has been read, for a received message. A short message and its associated status are stored in a Subscriber Identification Module (SIM) smart card, which is placed in a mobile communications device, or mobile station. This arrangement has the advantage that if the SIM is moved to another MS, the second MS will also know and understand the status of the messages originated by the user using the initial MS. Another advantage is that any application on the MS which interfaces with a SMS will have a standard definition of the status of a short message.

The short messaging service is a feature of GSM and GSM related systems, such as DCS1800 and PCS1900, and is also a feature of IS-95 and IS-136, the standards for United State of America Digital Cellular Systems. The protocol for sending and receiving are similar in these systems, which makes the status definition applicable to many SMS capable systems.

The current GSM short message service defines a status field in the SIM that identifies the status of a short message. This definition is currently limited to describing a message as received by, or originated from the MS, and provides an indication of whether the message has been sent or not, and whether or not the message has been read by the recipient. The current GSM definition is provided in Table 1, below, from Technical Specification GSM 11.11, in Elementary File (EF) short messages.

TABLE 1

| EF<sub>SMS</sub> (Short Messages) Contents | | | |
|---|---|---|---|
| Identitier: '6F3C' | Structure: linear fixed | | Optional |
| Record length: 176 bytes | Update activity: low | | |
| Access Conditions: | | | |
| READ | CHV1 | | |
| UPDATE | CHV1 | | |
| INVALIDATE | ADM | | |
| REHABILITATE | ADM | | |
| Bytes | Description | M/O | Length |
| 1 | Status | M | 1 byte |
| 2 to 176 | Remainder | M | 175 bytes |

Table 1 contains information in accordance with TS GSM 11.11 comprising short messages, also referred to herein as a basic message status set, and associated parameters, which have either been received by the MS from the network, or are to be used as an MS originated message.

The status field definition contains a status byte of a record which may be used as a pattern in the SEEK command, a SIM operation. It is encoded as shown in Table 2.

TABLE 2

| GSM Status Field Bit Definition | | | | | | | | |
|---|---|---|---|---|---|---|---|---|
| b8 | b7 | b6 | b5 | b4 | b3 | b2 | b1 | |
| | | | | | 0 | 0 | 0 | free space |
| | | | | | x | x | 1 | used space |
| | | | | | 0 | 0 | 1 | message received by MS from network; message read |
| | | | | | 0 | 1 | 1 | message received by MS from network; message to be read |
| | | | | | 1 | 0 | 1 | MS originating message; message sent to the network |
| | | | | | 1 | 1 | 1 | MS originating message; message to be sent |
| 0 | 0 | 0 | 0 | 0 | | | | Reserved for future use (RFU) |

The REMAINDER data item commences with the TS-Service-Center-Address as specified in TS GSM 04.11. The bytes immediately following the TS-Service-Center-Address contain an appropriate short message Transport Protocol Data Unit (TPDU) as specified in TS GSM 03.40, with identical coding and ordering of parameters. This invention expands upon the status definition defined in the GSM system.

References to pertinent GSM SMS standards are found in Digital Cellular Telecommunications System (Phase 2+); Specification of the Subscriber Identity Module—Mobile Equipment (SIM—ME) interface (GSM 11.11), European Telecommunications Standards Institute;

Digital cellular telecommunications system (Phase 2+); Technical realization of the Short Message Service (SMS) Point-to-Point (PP) (GSM 03.40), European Telecommunications Standards Institute;

TIA/EIA/IS-136.1 800 MHz TDMA Cellular-Radio Interface-Mobile Station-Base Station Compatibility-Digital Control Channel, Electronic Industries Association; and TIA/EIA/IS-6.37 Short Message Services for Wideband Spread Spectrum Cellular Systems, Electronic Industries Association.

SUMMARY OF THE INVENTION

An improved system of short message tracking in a wireless communications network, wherein a tracking system includes a status field bit definition having an 8-bit field wherein only three bits of the status field are used in a basic message status set, wherein the basic message status set consists of free space; used space; message received by MS from network—message read; message received by MS from network—message to be read; MS originating message—message sent to the network; and MS originating message to be sent as text; the improvement including an enhanced message status set including the basic message status set and an extended message status set, wherein all eight bits of the status field bit definition are used.

The method of the invention includes enhancing the message status set, which further includes: forming the basic message status set; defining a set of extended message tracking definitions which use all eight bits in the status field bit definition; and forming the set of extended messages tracking definitions, wherein the basic message status set and the extended message status set comprise an enhanced message status set.

An object of this invention is to provide additional tracking information for SMS.

A further object of the invention is to provide a user of a GSM device with enhanced message status information.

Another object of the invention is to expand the status field associated with SMS.

These and other objects and advantages of the invention will become more fully apparent as the description which follows is read in conjunction with the drawings.

DETAILED DESCRIPTION OF THE PREFERRED EMBODIMENT

The current Global System of Mobile Communications (GSM) short message service (SMS) message status definition defines only a few statuses of a message. This invention defines a more complete SMS status model, and a more extensive status definition that may be used across SMS systems to provide a standard SMS status indication. With the enhanced message status set of the invention, a mobile station (MS), also referred to herein as a mobile communications device (MCD), nay provide a more complete indication of the status of a message, such as successful delivery of the message to the destination, or the failure of the message to reach its intended destination. Applications for MS may have a standard definition of short message status using the invention.

This invention extends the status field to include a more extensive set of short message states. The enhanced model of the invention includes a status for delivery, acknowledgement and failure. The reserved for future use (RFU) bits of the status field are defined in order to accommodate these new statuses, referred to herein as an extended message status set. The extended message status set provides a more complete tracking of the status of a message, and is therefore more meaningful to the applications using the message status set.

Figure 1:
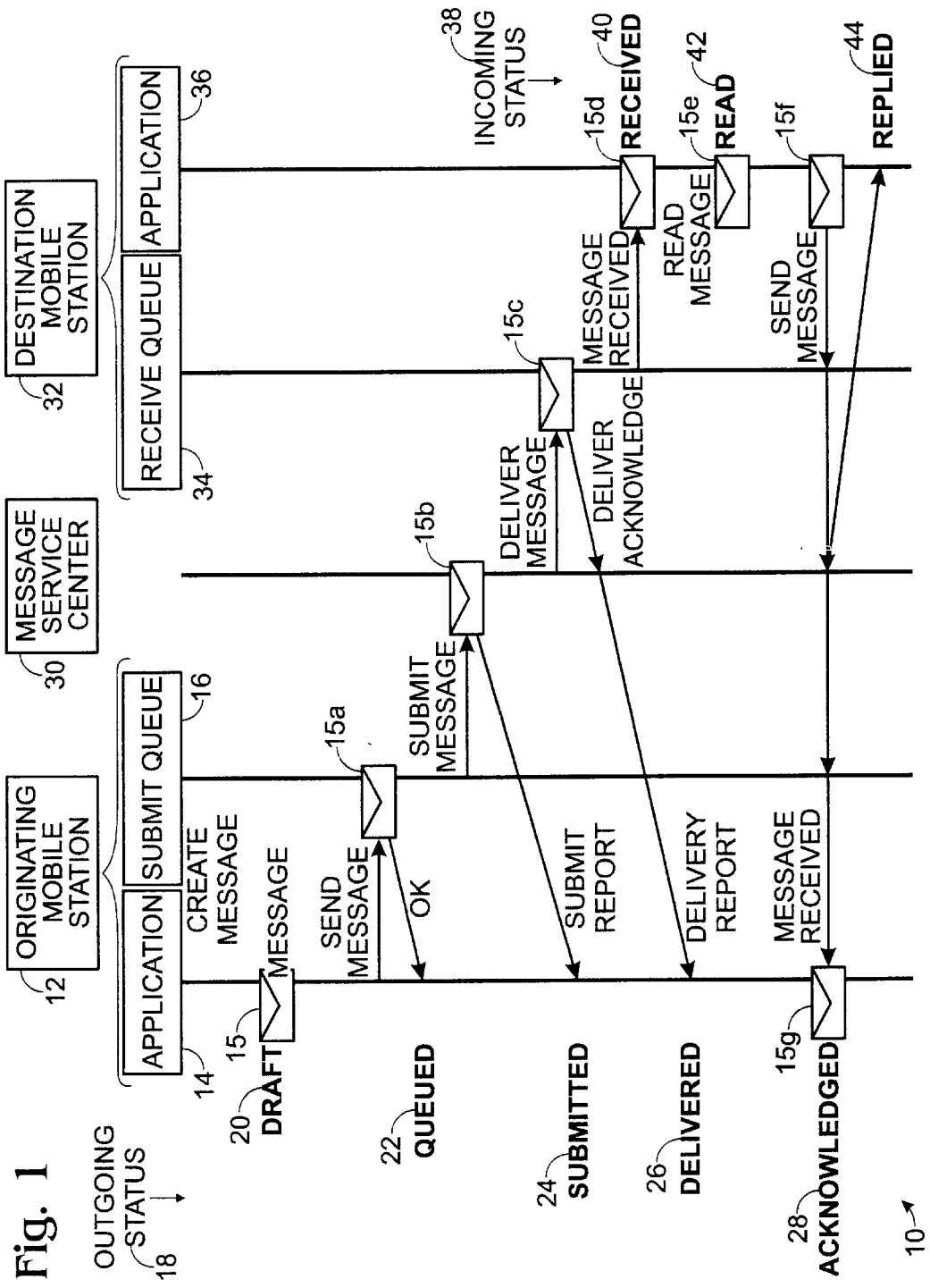
FIG. 1 is schematic representation of point-to-point short message transactions.

Point-to-point short message transactions are represented in FIG. 1, generally at 10. An originating mobile station (MS) 12 includes a queuing function, and an application 14 which generates a message 15. Messages are submitted to a queue 16, becoming a queued message 15a. The outgoing message status set, or states, 18 for message 15 includes a status for draft, 20, queued, 22, submitted, 24, delivered 26 and acknowledged 28. A message submitted to a message service center (MC) 30 becomes a submitted message 15b.

Message service center 30 serves as an intermediary between originating mobile station 12 and a destination mobile station (DMS) 32. DMS 32 includes a receive queue 34 and an application 36. Receive queue 34 holds a delivered message 15c, before passing the delivered message to application 36, where it becomes a received message 15d. Destination mobile station 32 has an incoming message status set 38 which includes a status for received 40, read 42 and replied 44. A message becomes a read message 15e once the user of DMS 32 displays the message. If the user of DMS 32 replies to the incoming message, a reply message 15f is generated and sent. A REPLIED status 44 is indicated by application 36 in MS 32. When DMS 32 replies to a message, a reply message is sent and the status of the received message is indicated as REPLIED. MS 12 receives the reply message and knows that the reply message is an acknowledgement 15g of the sent message, and marks the status of the message as ACKNOWLEDGED 28.

Figure 2:
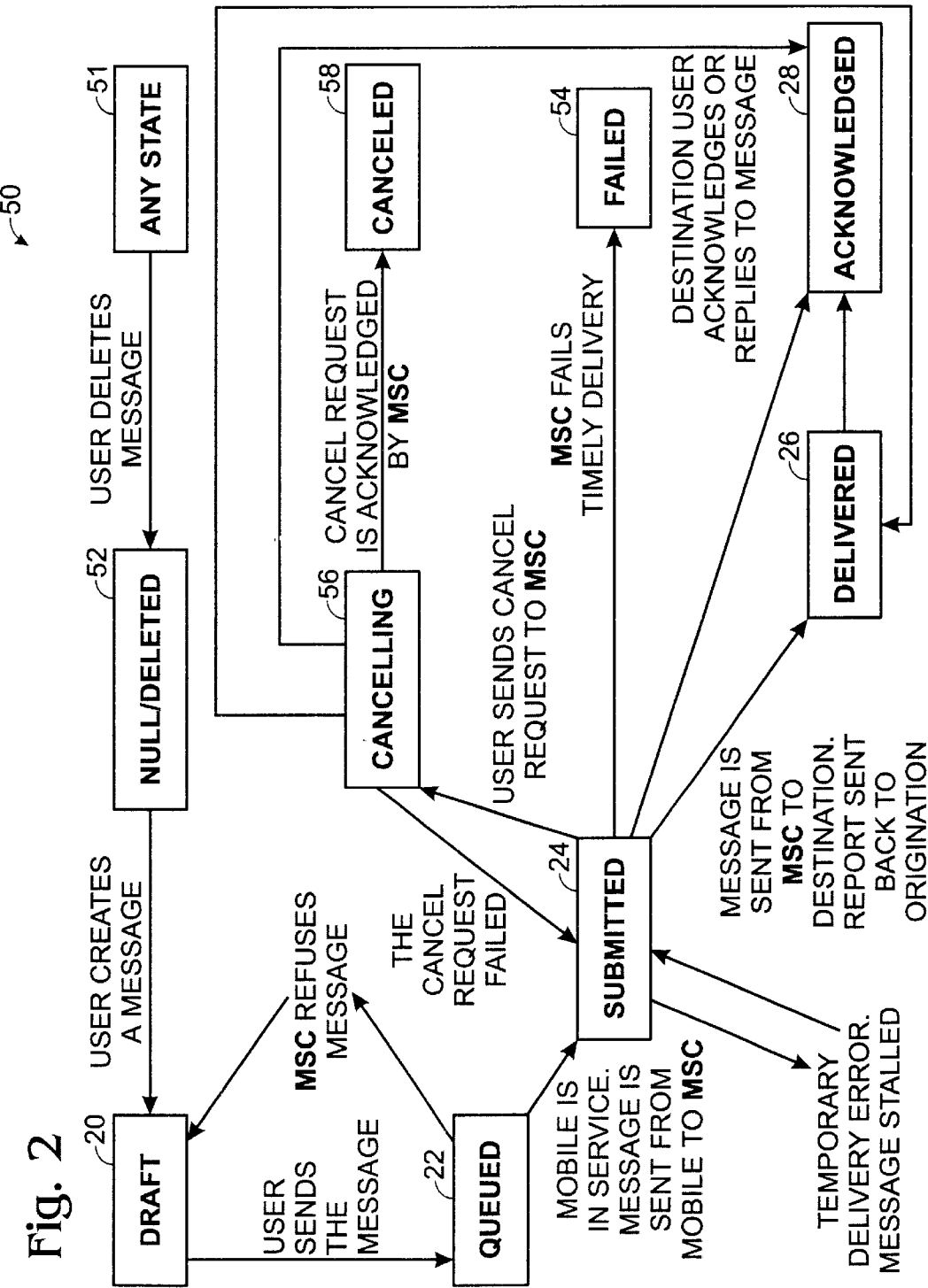
FIG. 2 is a block diagram of point-to-point outgoing short message statuses.

Referring now to FIGS. 1 and 2, outgoing message status set statuses are depicted in FIG. 2 generally at 50. The outgoing status set include those statuses identified in connection with FIG. 1, and a number of other statuses. If a message, for instance, is in ANY STATE, block 51, and the user chooses to delete that message, that message transitions to the DELETED state.

CANCELLING block 56, indicating that the user has requested that the message be cancelled before delivery.

CANCELLED block 58, indicating that the message has been cancelled by the service center. As will be appreciated by those of ordinary skill in the art, a CANCEL, request must be received by the MC before delivery, or the message will be delivered. A CANCEL request has no meaning once a message is delivered.

Incoming Message Status Set

RECEIVED block 40, indicates that message 15d has been received by application 36 in destination mobile station 32.

REPLIED block 44, indicates that the recipient has acknowledged the message or sent a reply 15f to the user of MS 12.

A secondary incoming message status is READ, block 42, which tells the user that message 15e has been read or displayed by the receiving party. This is toggled with block 62, UNREAD.

In order to accomplish the foregoing indications of message status, the status bits of a preferred embodiment of an extended message status set of the invention are shown in Table 3 in BOLD type. It will be apparent to one of ordinary skill in the art that the exact use of b1–b8 may be modified in the implementation of the invention, although the scheme as presented is deemed to be a most efficient implementation of the invention. The combination of the basic message status set and the extended message status set comprise what is referred to herein as an enhanced message status set.

TABLE 3

Enhanced Status Field Bit Definition

| b8 | b7 | b6 | b5 | b4 | b3 | b2 | b1 | | |
|---|---|---|---|---|---|---|---|---|---|
| 0 | 0 | 0 | 0 | 0 | 0 | 0 | 0 | free space (empty) | |
| x | x | x | x | x | x | x | 0 | Deleted message | (52) |
| x | x | x | x | x | x | x | 1 | used space | |
| 0 | 0 | 0 | 0 | 0 | 0 | 0 | 1 | message received by DMS from network; message read | (42) |
| 0 | 0 | 0 | 0 | 0 | 0 | 1 | 1 | message received by DMS from network; message to be read | (40) |
| 0 | 0 | 0 | 0 | 0 | 1 | 0 | 1 | MS originating message; message sent to the network | (15b) |
| 0 | 0 | 0 | 0 | 0 | 1 | 1 | 1 | MS originating message; message to be sent | (15a) |
| 0 | 0 | 0 | 0 | 0 | 1 | 0 | 1 | MS originated message, but not ACKNOWLEDGED by recipient | |

TABLE 3-continued

Enhanced Status Field Bit Definition

| b8 | b7 | b6 | b5 | b4 | b3 | b2 | b1 | | |
|----|----|----|----|----|----|----|----|---|---|
| 0 | 0 | 0 | 0 | 1 | 1 | 0 | 1 | MS originated message; and ACKNOWLEDGED by recipient | (28) |
| 0 | 0 | 0 | 0 | 0 | 0 | x | 1 | message received by DMS, but has not been REPLIED | (40) |
| 0 | 0 | 0 | 0 | 1 | 0 | x | 1 | message received by MS and REPLIED to originator | (44) |
| 0 | 0 | 0 | 0 | 0 | 1 | 0 | 1 | MS originated message, but network has not DELIVERED it | (15b) |
| 0 | 0 | 0 | 1 | 0 | 1 | 0 | 1 | MS originated message and network has DELIVERED it | (15c) |
| 0 | 1 | 1 | 1 | 0 | 1 | 0 | 1 | MS originated message and MC FAILED to deliver | (54) |
| 1 | 0 | 0 | 1 | 0 | 1 | 0 | 1 | Originated message is CANCELLING | (56) |
| 1 | 1 | 1 | 1 | 0 | 1 | 0 | 1 | Originated message has been CANCELLED | (58) |

Bit definition for this new arrangement is as follows:
Bit 1: 0=indicates free (deleted message) or 1=used space.
Bit 2: For originated messages, indicates: Sent or not sent. For terminated messages, indicates: Read or Unread.
Bit 3: Indicates: 1 for originated messages, 0 for terminated messages.
Bit 4: Indicates: That the message was Acknowledged/Replied.
Bit 5: For an originated message:
  Indicates: 0=no delivery status knowledge,
    1=delivery status or error.
Bits 8, 7, and 6, where Bit 8=0 indicates a Delivery status:
  0,0,0: indicates successful message delivery.
  0,1,1: indicates the MC has failed to deliver the message.
Bits 8, 7, and 6, where Bit 8=1 indicates a Cancel status:
  1,0,0: indicates a message cancel request has been sent.
  1,1,1: indicates the message was cancelled.
Optional status values:
Bits 8, 7, and 6. Where Bit 8=0 indicates a delivery status:
  0,0,1: indicates the message was REFUSED by the MC.
  0,1,0: indicates the message is STALLED in the MC
Bits 8, 7, and 6, where Bit 8=1 indicates a Cancel status:
  1,1,0: indicates the cancel request has failed.

Thus, an enhanced text message tracking system and method of implementing the same has been disclosed which adds to the GSM standards currently in effect. Although a preferred embodiment of the invention has been disclosed, it will be appreciated that further variations and modifications may be made thereto without departing from the scope of the invention as defined in the appended claims.

Figure 3:
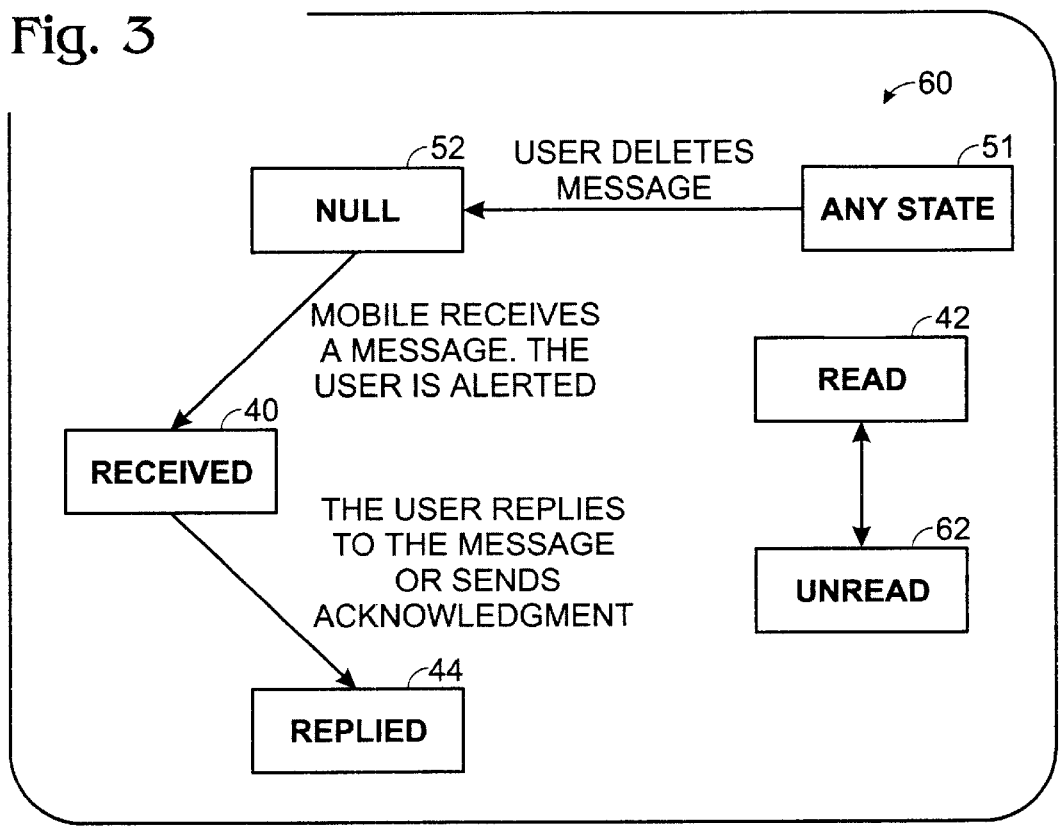
FIG. 3 is a block diagram of point-to-point incoming short message statuses.

Referring now to FIGS. 1 and 3, an incoming message status set is depicted in FIG. 3 generally at 60. The incoming message status set includes those statuses identified in connection with FIG. 1, and another status.

The designated status blocks have the following definitions:

Outgoing Message Status Set
  NULL/DELETED block 52, which indicates that a message has been deleted or is otherwise unused.
  DRAFT block 20, which indicates that the user has created message 15 but has not sent (submitted) it. A DRAFT message is editable by an application before it is sent.
  QUEUED block 22, meaning that the user has requested to send message 15, but the device is waiting for a connection to the network to submit message 15*a*.
  SUBMITTED block 24, indicating that message 15*a* has been sent to message service center 30 and delivery to the MC has been acknowledged. This constitutes a single transaction.
  DELIVERED block 26, meaning that the message center has given a status update that indicates message 15*c* has been delivered to DMS 32 receive queue 34.
  ACKNOWLEDGED block 28, indicating that the destination user has REPLIED to or sent acknowledgement of receiving message. 15*g*.
  FAILED block 54, meaning that the message center could not deliver the message, which may be caused by the time-out of the validity period, or as a result of a communication error.

I claim:

1. An improved system of short message tracking in a wireless communications network, wherein a tracking system includes a status field bit definition having an 8-bit field wherein only three bits of the status field are used in a basic message status set, wherein the basic message status set consists of free space; used space; message received by mobile station from network—message read, message received by mobile station from network—message to be read; mobile station originating message—message sent to the network; and mobile station originating message to be sent as text; the improvement comprising:

an enhanced message status set including the basic message status set and an extended message status set, wherein all eight bits of the status field bit definition are used.

2. The improved system of claim 1 wherein said extended message status set includes a mobile station originated message, but not acknowledged by recipient.

3. The improved system of claim 1 wherein said extended message status set includes a mobile station originated message; and acknowledged by recipient.

4. The improved system of claim 1 wherein said extended message status set includes a message received by mobile stations, but has not been replied.

5. The improved system of claim 1 wherein said extended message status set includes a message received by mobile station and replied to originator.

6. The improved system of claim 1 wherein said extended message status set includes a mobile station originated message, but network has not delivered it.

7. The improved system of claim 1 wherein said extended message status set includes a mobile station originated message and network has delivered it.

8. The improved system of claim 1 wherein said extended message status set includes a mobile station originated message and MC failed to deliver.

9. The improved system of claim 1 wherein said extended message status set includes Originated message is cancelling.

10. The improved system of claim 1 wherein said extended message status set includes originated message has been cancelled.

11. An improved method of short message tracking in a wireless communications network, wherein a tracking system forming a basic message status set having a status field bit defining having an 8-bit field in which only three bits of the field are used, including free space, used space; message received by mobile station from network—message read; message received by mobile station from network—message to be read; mobile station originating message—message sent to the network; and mobile station originating message to be sent as text; the improvement comprising:

enhancing the message status set which includes;

forming the basic message status set;

defining a set of extended message tracking definitions which use all eight bits in the status field bit definition; and forming the set of extended messages tracking definitions, wherein the basic message status set and the extended message status set comprise an enhanced message status set.

12. The improved method of claim 11 wherein said defining includes defining a field definitions of mobile station originated message, but not acknowledged by recipient.

13. The improved method of claim 11 wherein said defining includes defining a field definitions of mobile station originated message, and acknowledged by recipient.

14. The improved method of claim 11 wherein said defining includes defining a field definitions of message received by mobile stations but has not been replied to.

15. The improved method of claim 11 wherein said defining includes defining a field definitions of message received by mobile station and replied to originator.

16. The improved method of claim 11 wherein said defining includes defining a field definitions of mobile station originated message, but network has not delivered it.

17. The improved method of claim 11 wherein said defining includes defining a field definitions of mobile station originated message and network has delivered it.

18. The improved method of claim 11 wherein said defining includes defining a field definitions of mobile station originated message and MC failed to deliver.

19. The improved method of claim 11 wherein said defining includes defining a field definitions of originated message is cancelling.

20. The improved method of claim 11 wherein said defining includes defining a field definitions of originated message has been cancelled.

* * * * *